(12) United States Patent
Habedank et al.

(10) Patent No.: US 7,517,022 B2
(45) Date of Patent: Apr. 14, 2009

(54) VEHICLE SEAT

(75) Inventors: Klaus-Dieter Habedank, Stadthagen (DE); Meinhard Behrens, Obernkirchen (DE)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 11/520,708

(22) Filed: Sep. 14, 2006

(65) Prior Publication Data

US 2007/0063565 A1    Mar. 22, 2007

(30) Foreign Application Priority Data

Sep. 17, 2005    (DE) .................. 10 2005 044 555

(51) Int. Cl.
*B60N 2/02* (2006.01)

(52) U.S. Cl. .............. 297/378.12; 297/341; 297/378.1; 297/15

(58) Field of Classification Search .......... 297/341, 297/378.1, 378.12, 15; 296/65.09, 65.01
See application file for complete search history.

(56) References Cited

U.S. PATENT DOCUMENTS

| | | | | |
|---|---|---|---|---|
| 5,597,206 A | * | 1/1997 | Ainsworth et al. | 297/378.12 |
| 6,152,533 A | * | 11/2000 | Smuk | 297/341 |
| 7,014,263 B2 | * | 3/2006 | Mukoujima et al. | 297/341 |
| 7,040,684 B2 | * | 5/2006 | Tame et al. | 296/65.09 |
| 7,137,667 B2 | * | 11/2006 | Habedank | 297/378.12 |

FOREIGN PATENT DOCUMENTS

DE    203 03 753 U1    8/2004
DE    10 2004 008 177 A1    9/2004

OTHER PUBLICATIONS

U.S. Appl. No. 10/358,326, filed Feb. 2003.
U.S. Appl. No. 11/213,738, filed Aug. 2005.
U.S. Appl. No. 11/230,925, filed Sep. 2005.
U.S. Appl. No. 11/238,963, filed Sep. 2005.
U.S. Appl. No. 11/284,898, filed Nov. 2005.
U.S. Appl. No. 11/299,747, filed Dec. 2005.
U.S. Appl. No. 11/328,192, filed Jan. 2006.
U.S. Appl. No. 11/346,313, filed Feb. 2006.
U.S. Appl. No. 11/377,335, filed Mar. 2006.

(Continued)

*Primary Examiner*—David Dunn
*Assistant Examiner*—Erika Garrett
(74) *Attorney, Agent, or Firm*—Shlesinger, Arkwright & Garvey LLP

(57) ABSTRACT

Vehicle seat includes seat frame longitudinally adjustable on an upper rail relative to a lower rail affixed to the chassis. Seat frame is held in place in its longitudinal positions by a longitudinal locking mechanism, releasable by a rail release mechanism. A backrest with a backrest frame is pivotably attached to seat frame, locked in place on seat frame by a stop adjustment mechanism, and, once released by a release lever, can be folded forward from an upright use position to an easy-entry position. Easy-entry manipulation device actuates release lever, a seat cushion adjustable relative to seat frame, with a seat cushion frame, which is shifted forward longitudinally in a coupled adjustment motion when backrest frame is folded forward to easy-entry position. When vehicle seat is in easy-entry position the seat cushion frame can be shifted rearwardly relative to the backrest frame and seat frame.

20 Claims, 14 Drawing Sheets

OTHER PUBLICATIONS

U.S. Appl. No. 11/387,979, filed Mar. 2006.
U.S. Appl. No. 11/413,114, filed Apr. 2006.
U.S. Appl. No. 11/444,504, filed Jun. 2006.
U.S. Appl. No. 11/481,800, filed Jul. 2006.
U.S. Appl. No. 11/500,487, filed Aug. 2006.
German Office Action dated Mar. 9, 2006 in German Application No. 10 2005 044 555.1, filed Sep. 17, 2005 (3 pages).

* cited by examiner

VEHICLE SEAT

CROSS-REFERENCE TO RELATED APPLICATIONS

This application claims priority of German Application No. 10 2005 044 555.1, filed Sep. 17, 2005, and which is incorporated herein by reference.

FIELD OF THE INVENTION

The invention relates to a vehicle seat including a seat frame longitudinally adjustable on at least one upper rail relative to at least one lower rail affixed to a chassis of a vehicle.

BACKGROUND OF THE INVENTION

A vehicle seat of this type is known from DE 10 2004 008 177 A1. The seat frame, for example a seat bracket, can be shifted longitudinally on, for example, two upper rails that are opposite lower rails on the chassis side. A backrest is pivotably attached to the seat frame, and is locked in place via a stop adjustment mechanism, wherein a seat cushion with a seat cushion frame is accommodated such that it can be shifted longitudinally toward the front, and is coupled to the backrest frame of the backrest. In this manner, in DE 10 2004 008 177 A1 the seat cushion frame is pivotably attached to the backrest frame above the pivoting axis of the backrest, such that when the released backrest is folded forward, the seat cushion frame is shifted forward.

In this manner an easy-entry adjustment is possible, in which the user first releases the stop adjustment mechanism via, for example, an easy-entry lever and a connecting element, for example a connecting rod or a Bowden control cable, and then folds the backrest forward, wherein the seat frame is shifted longitudinally toward the front, and the seat cushion frame is shifted forward and downward, in order to create space for the backrest to pivot.

When space limitations are tight, however, this type of easy-entry adjustment is often problematic, as in this case the seat cushion can butt up against the vehicle seat in a front row of seating. In such cases, only a small adjusting movement of the seat cushion, and thus a limited folding movement of the backrest, is frequently possible.

OBJECTS AND SUMMARY OF THE INVENTION

An object of the invention is to enable an adjustment of the vehicle seat to the easy-entry position, in which the vehicle seat is shifted forward longitudinally, the backrest is folded forward, and the seat cushion is shifted forward, even when limited installation space is available.

This object is achieved with a vehicle seat including a seat frame, the seat frame being longitudinally adjustable on at least one upper rail relative to at least one lower rail affixed to a chassis. The seat frame is lockable in longitudinal positions by a longitudinal locking mechanism, which can be released by a rail release mechanism. There is a backrest, the backrest including a backrest frame pivotably attached to the seat frame about a backrest pivoting axis, and which is lockable by a stop adjustment mechanism on the seat frame, and which, once released, in use, can be folded forward from an upright use position to an easy-entry position. A release lever for releasing the stop adjustment mechanism is provided, and an easy-entry device for actuating the release lever. A seat cushion, the seat cushion being shiftable relative to the seat frame with a seat cushion frame, and the seat cushion frame is shifted forward longitudinally in a coupled adjustment motion, in use, when the backrest frame is folded forward to the easy-entry position. When the vehicle seat is in the easy-entry position, in use, the seat cushion frame is shiftable toward the rear relative to the backrest frame and the seat frame.

Additional features and vehicle seat embodiments according to the invention are set forth below.

Thus, according to the invention, in the easy-entry adjustment of the vehicle seat, when the seat cushion frame encounters an obstacle, especially a front vehicle seat, it is shifted toward the rear relative to the seat frame that has been shifted forward and the backrest that has been folded forward. For this purpose, a longitudinally adjustable connection of the seat cushion frame to the backrest frame is advantageously provided. This can be achieved according to alternative embodiments, for example with a pin/link guide/guideway or a pin/slot/guideway between the seat cushion frame and the backrest frame, or even with a lever mechanism between the seat cushion frame and the backrest frame.

In addition, when in the use position, when the easy-entry lever is not actuated, the seat cushion frame is advantageously pin-connected to the backrest frame by way of a locking mechanism, and can be longitudinally adjusted relative to the backrest frame only when the easy-entry lever has been actuated. For the purpose of locking the seat cushion frame in place, according to the invention a locking cam is advantageously pivotably attached to the backrest frame, and can be pivoted from a locked position to a released position by way of a control cable that is actuated via the easy-entry lever, against its spring preload. In this manner a secure locking of the seat cushion in place in its normal use position is ensured. When the easy-entry lever is actuated, the locking cam is pivoted and thereby released, so that the longitudinal adjustability of the seat cushion with the seat cushion frame relative to the backrest is enabled. In this connection, when the backrest is in a forward-folded position, a locking element can prevent the locking cam from being lowered, so that when the vehicle seat is not longitudinally shifted and the easy-entry lever has been released, a re-locking of the seat cushion frame by the locking cam is prevented.

The release of the rails is advantageously controlled based upon the folded position of the backrest, for which purpose a control cam fixed in the backrest pivots a rail release lever. The folded position of the backrest in the easy-entry position can be fixed in place by way of a retaining element, such as a pivotably attached retaining plate, which, for example, engages in the control cam and secures the backrest against further forward-folding movement.

Below, the invention will be described in greater detail in terms of a number of embodiments, with reference to the drawings.

BRIEF DESCRIPTION OF THE DRAWINGS

FIG. 5a is a side view of an enlargement of a section of a vehicle seat according to a further embodiment, in its use position, i.e. according to FIG. 1a;

FIG. 5d is a side view of the vehicle seat with the backrest folded forward in the easy-entry position, i.e. according to FIG. 2a; and FIG. 5e is a side view of the vehicle seat shifted forward in the easy-entry position and with the seat cushion shifted toward the rear, i.e. according to FIG. 3a.

DETAILED DESCRIPTION OF THE INVENTION

Figure 1:
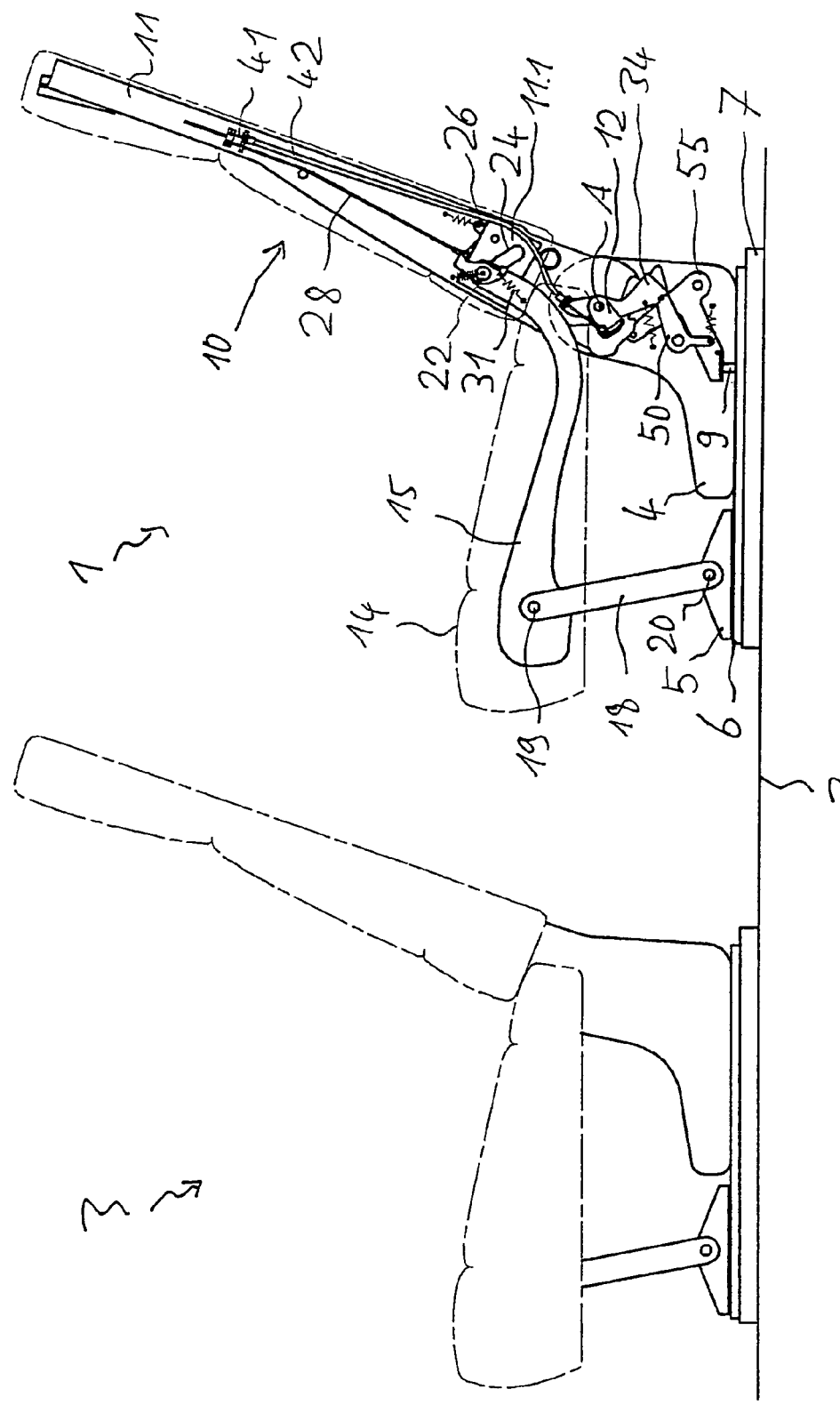
FIG. 1 is a side view of a vehicle seat in a second row of seats, according to a first embodiment of the invention, in an upright, use position.

A vehicle seat 1 in a second row of seating is attached to a vehicle chassis 2 such that it can be longitudinally shifted, and spaced from a front vehicle seat 3 in the first row of seating. The vehicle seat 1 includes a bracket 4 and a front bearing block 5, as a seat frame 4, 5, which are mounted on upper rails 6, and which in turn can be longitudinally displaced relative to lower rails 7 that are fixed on the chassis, and that can be locked in place in their longitudinal positions by way of a rail locking mechanism, which can be released by way of a rail release mechanism 9, shown by way of example in FIG. 1a.

Figure 1A:
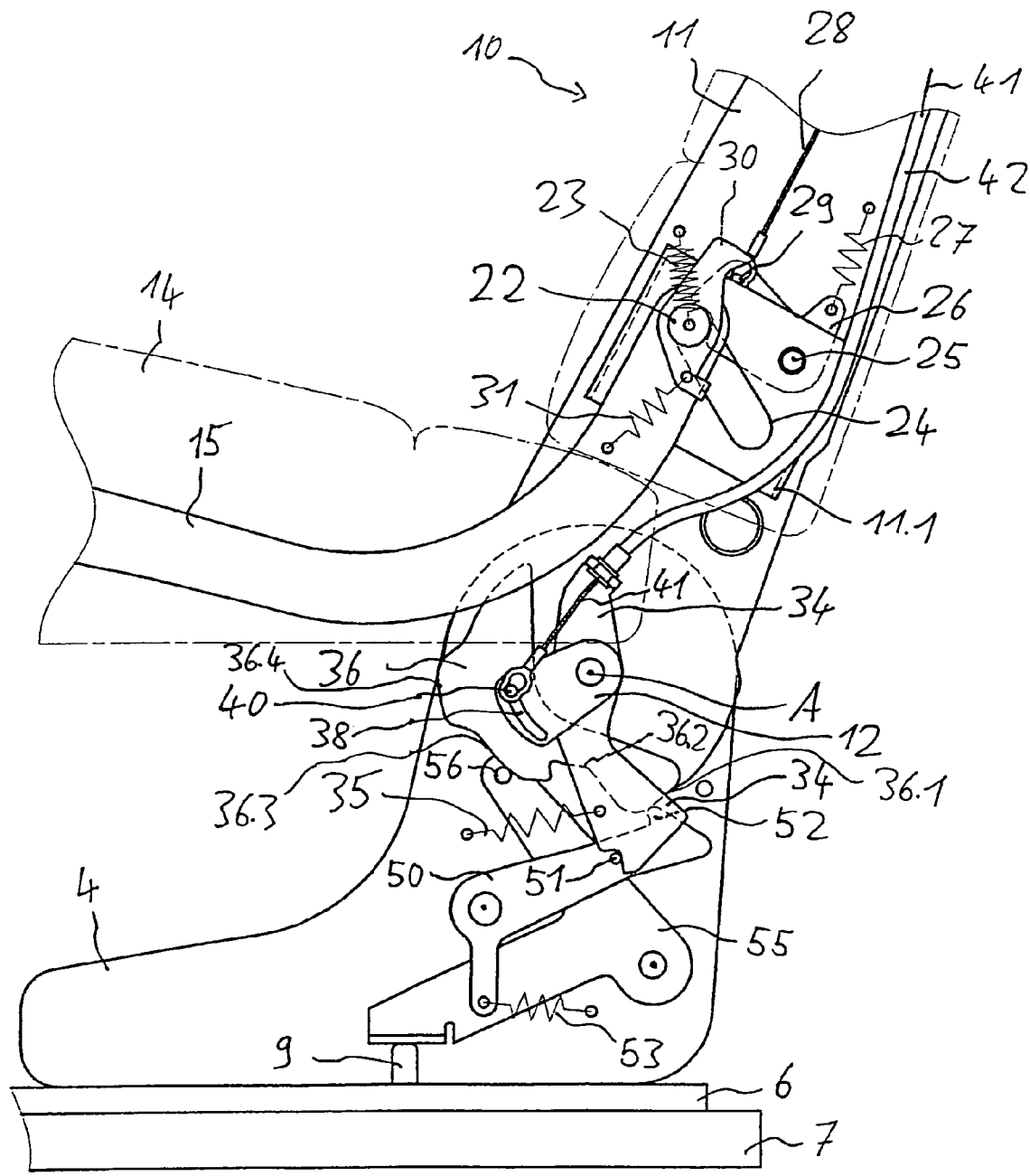
FIG. 1a is a side view of an enlargement of a section of the vehicle seat of FIG. 1.

A backrest 10 with a backrest frame 11 is foldably hinged to the bracket 4 on a backrest pivoting axis A, and is locked in place by way of a stop adjustment mechanism that is not shown in greater detail here, and which in turn is released by the clockwise pivoting of a release lever 12 (in FIG. 1a).

The vehicle seat 1 further includes a seat cushion 14 with a seat cushion frame 15, the front of which is pivotably attached via a rocker arm 18 to the front bearing block 5. In the use position the rocker arm 18 extends substantially vertically, dropping downward from its upper pivot point 19 on the seat cushion frame 15, and somewhat toward the rear to its lower pivot point 20 on the bearing block 5.

At the rear of the seat cushion frame 15 a pin 22 that protrudes axially is provided, which is guided directly or with a mounted roller in a substantially straight guide 24 in the backrest frame 11 that extends downward and toward the rear. For this purpose the guide 24 can be formed in a bearing plate 11.1 that is welded to the backrest frame 11. In the use position shown in FIGS. 1, 1a, the pin 22 lies at the upper, front end of the guide 24, and is locked in place in this position by a locking cam 26 that is pivotably attached to the backrest frame 11—for example on the bearing plate 11.1—at a pinned joint 25, for which purpose the locking cam 26 has, for example, a corresponding graduation or a stop mechanism. The locking cam 26 is prestressed (e.g., biased) in the locked position of FIG. 1a via a spring 27 and can be pivoted via a first control cable 28 to release the pin 22/the roller against the force of the spring. On the locking cam 26 a locating pin 29 extends axially or transversely, i.e. out of the plane of the drawing.

Further, a locking plate 30 is pivotably attached to the pin 22, and is prestressed or biased in a clockwise direction via a spring 31. The locking plate 30 serves to block or lock the locking cam 26, as will be described in greater detail below, and in the use position shown in FIGS. 1 and 1a is in a pivoted position in which it is spaced from the locating pin 29 of the locking cam 26.

Figure 4:
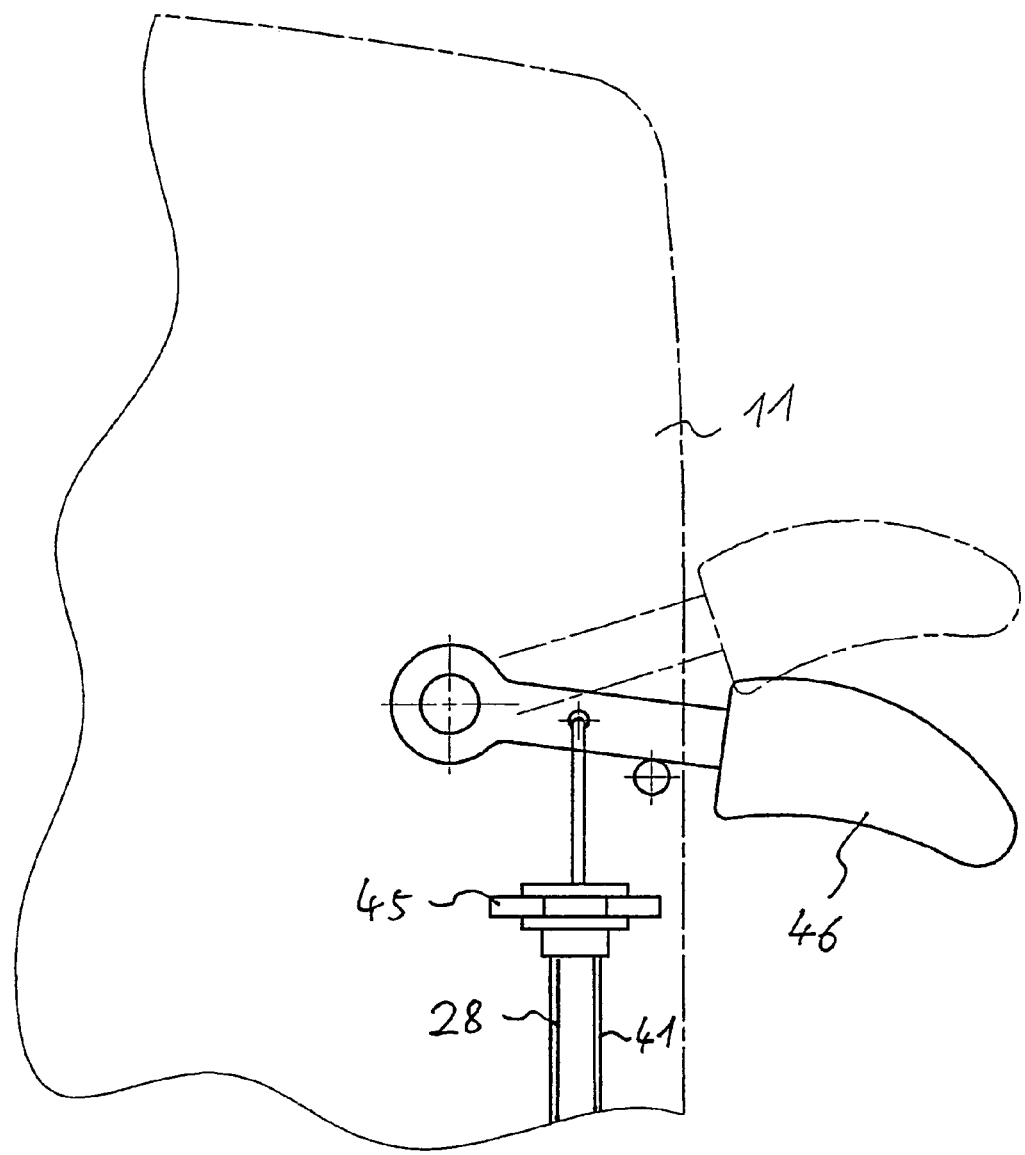
FIG. 4 is a side view of the easy-entry lever.

A pivoting plate 34 is pivotably mounted on the backrest pivoting axis A and is prestressed in a clockwise direction via a spring 35. A control cam 36 (or control plate) is stationarily welded to the backrest frame 11 and has, among other things, a first curve region 36.1 with a large radius to the backrest pivoting axis A, a recess 36.2 with a small radius to the backrest pivoting axis A, a third curve region 36.3 that is adjacent to the recess 36.2, and a radially protruding fourth curve region 36.4. The components 12, 34 and 36 thus pivot around the backrest pivoting axis A. In the release lever 12 a guide 38 that extends with a constant radius to the backrest pivoting axis A is formed, in which a locating pin 40 for a second control cable 41 (or control cable core 41) is held, the second control cable sheath 42 of which is fastened to or supported against the pivoting lever 34. The two control cables 28, 41 are connected to a common control cable receptacle 45 as shown in FIG. 4, which in turn is actuated via an easy-entry lever 46 that is pivotably mounted, for example, in an upper region of the backrest 10 (in FIG. 1 the easy-entry lever 46 is not shown). Thus when the easy-entry lever 46 is pivoted upward the locking cam 26 is pivoted by the first control cable 28 to release the pin 22, and the release lever 12 is pivoted via the second control cable 41 to release the stop adjustment mechanism. In the use position shown in FIGS. 1 and 1a, the locating pin 40 of the second control cable 41 lies at the upper end of the guide 38, so that when the second control cable 41 is actuated the release lever 12 is pivoted without dead space.

Further, a retaining plate 50 with an axially protruding pin 51 and a hook 52 is pivotably attached to the bracket 4, wherein said plate lies adjacent to the control cam 36, prestressed via a spring 53, and with a folding movement of the backrest 10 glides along the control cam 36. In the non-actuated, use position shown in FIGS. 1 and 1a the pivoting plate 34 is forced toward and spaced from the pin 51 of the retaining plate 50 by the prestressing of its spring 35, whereby its position is defined. Furthermore, a rail release lever 55 is pivotably attached to the bracket 4, and lies with its lower lever arm against the rail release mechanism 9, with a pin 56 that is provided in its upper lever arm lying against the control cam 36. When the backrest 10 is folded, the pin 56 thus glides along the control cam 36, hence the configuration of the control cam 36 determines whether or not the rail release mechanism 9 is released by the rail release lever 55.

In the use position shown in FIG. 1a, the release levers 12 for the stop adjustment mechanism and the rail release mechanism 9 are not actuated. The pin 22 of the seat cushion frame 15 lies at the upper, front end of the guide 24.

Figure 1B:
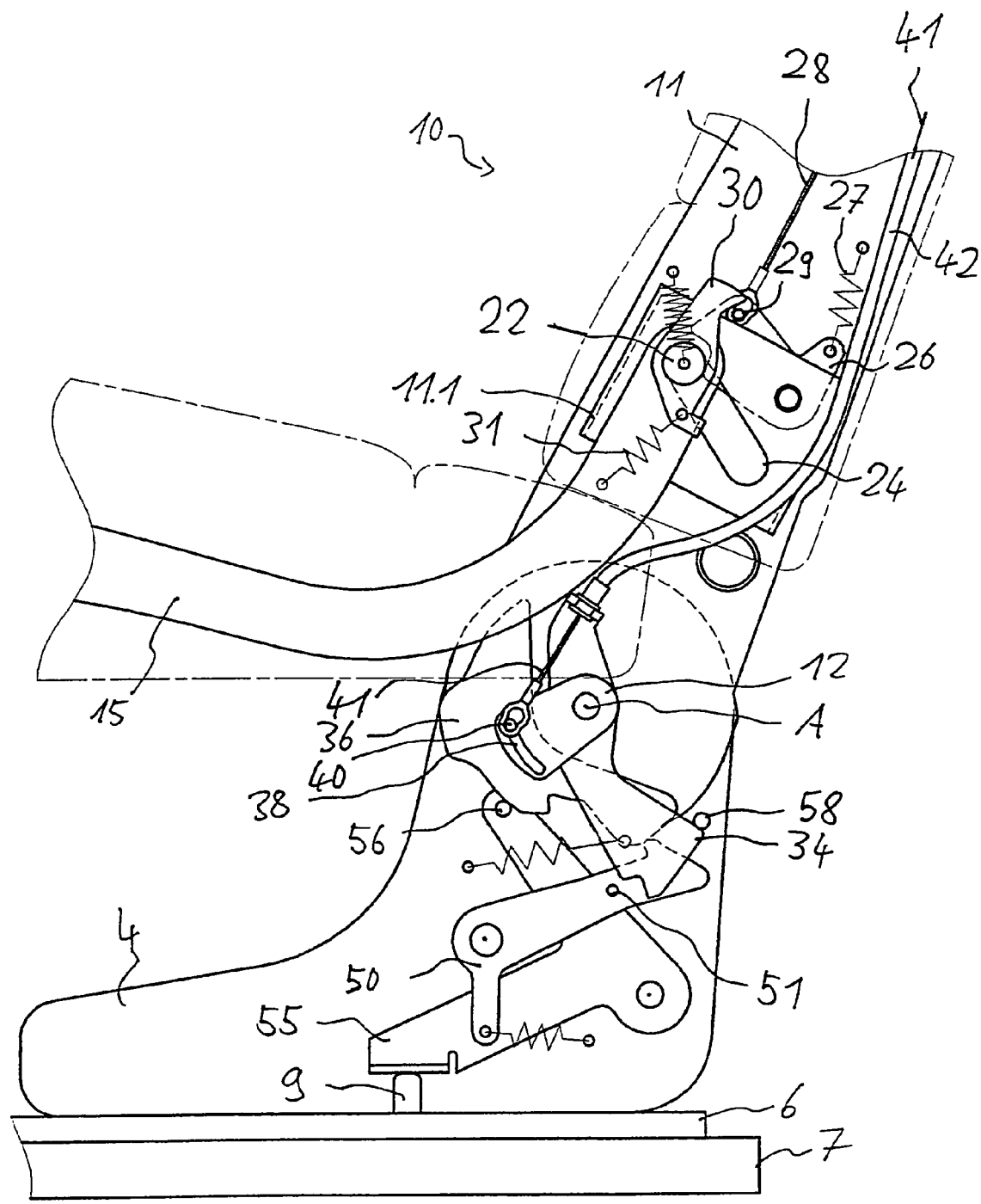
FIG. 1b is a side view of the vehicle seat of FIG. 1a with a subsequently slightly raised easy-entry lever.

Starting from the use position shown in FIG. 1b, the easy-entry lever 46 is first raised slightly, whereby a corresponding amount of tensile force is exerted on the control cables 28 and 41. The locking cam 26 pivots upward somewhat, without its pin 29 reaching the locking plate 30. The tensile force exerted on the second control cable 41 causes the distance between the locating pin 40 and the connection of the control cable sheath 42 on the pivoting plate 34 to be shortened. Because the spring force or the torque exerted by the spring 35 that is prestressing the pivoting plate 34 is weaker than the spring force or the torque exerted by the internal spring of the stop adjustment mechanism of the backrest frame 11 on the bracket 4, the stop adjustment mechanism is not at first released, in other words the release lever 12 is not pivoted; rather the pivoting plate 34 is first pivoted counterclockwise until it reaches a mechanical stop 58 on the side of the bracket. This pivoting movement causes the pivoting plate 34 to release the pin 51 of the retaining plate 50.

Figure 1C:
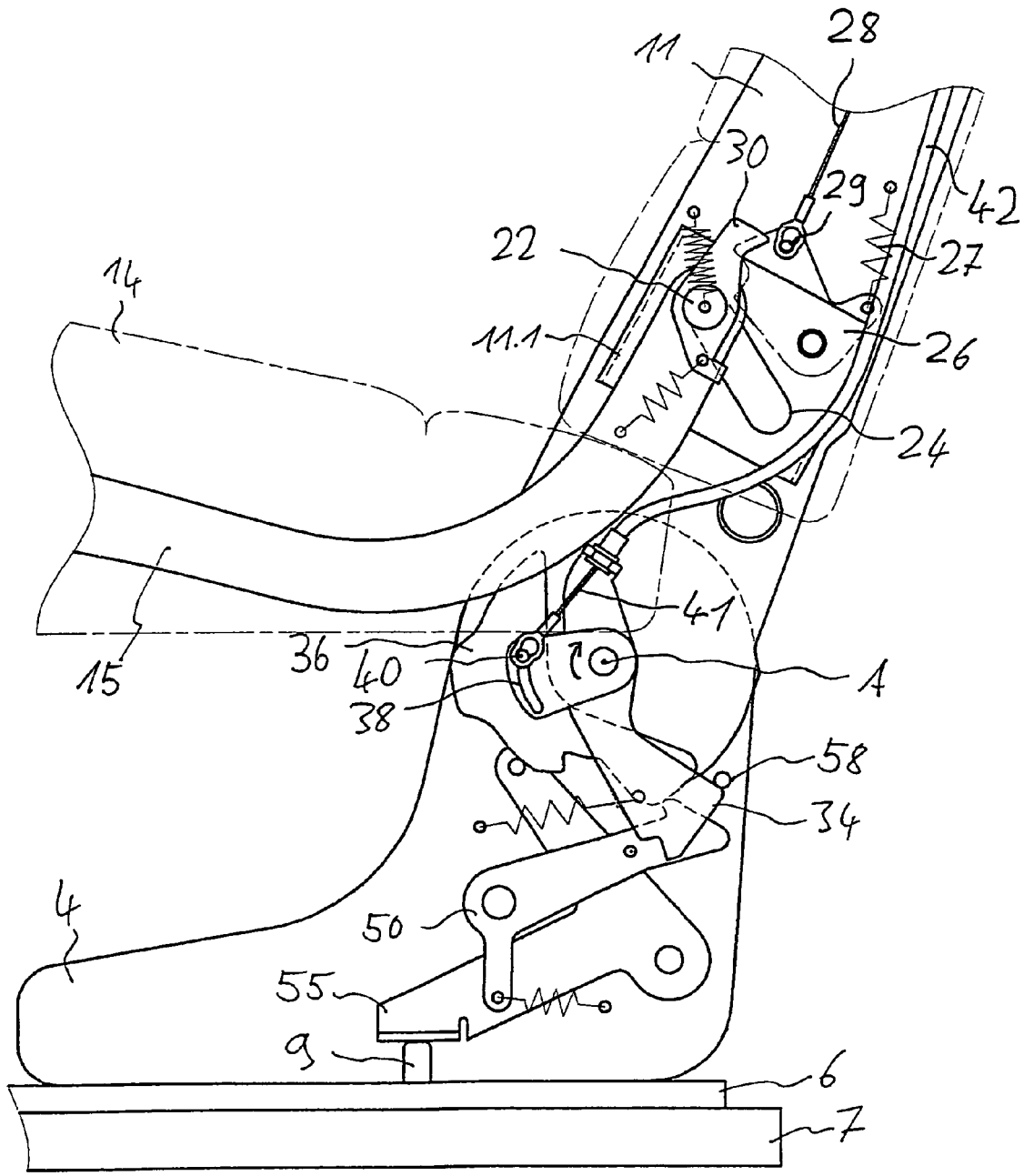
FIG. 1c is a side view of the vehicle seat of FIG. 1b with a fully actuated easy-entry lever, a released stop adjustment mechanism, and an unmoved backrest.

With the further actuation of the easy-entry lever 46 to its final upper position the pivoting plate 34 cannot pivot any further, so that, as shown in FIG. 1c, the second control cable 41 subsequently pivots the release lever 12 clockwise, thereby releasing the stop-catch mechanism between the backrest 10 and the bracket 4. With this actuation of the release lever 12, the locating pin 40 remains at the upper end of the guide 38. The first control cable 28 further pivots the locking cam 26 clockwise, allowing its locating pin 29 to pass across the end surface of the locking plate 30. The locking cam 26 thus releases the pin 22 or the roller of the seat cushion frame 15, so that it can slide into the guide 24. However, as a result of the spring preload exerted on the pin 22 by a tension spring 23 attached to the backrest frame 11, the pin 22 is not shifted at first. The second control cable 41 pivots the release lever 12 completely, so that the stop adjustment mechanism of the backrest 10 is released.

Figure 2:
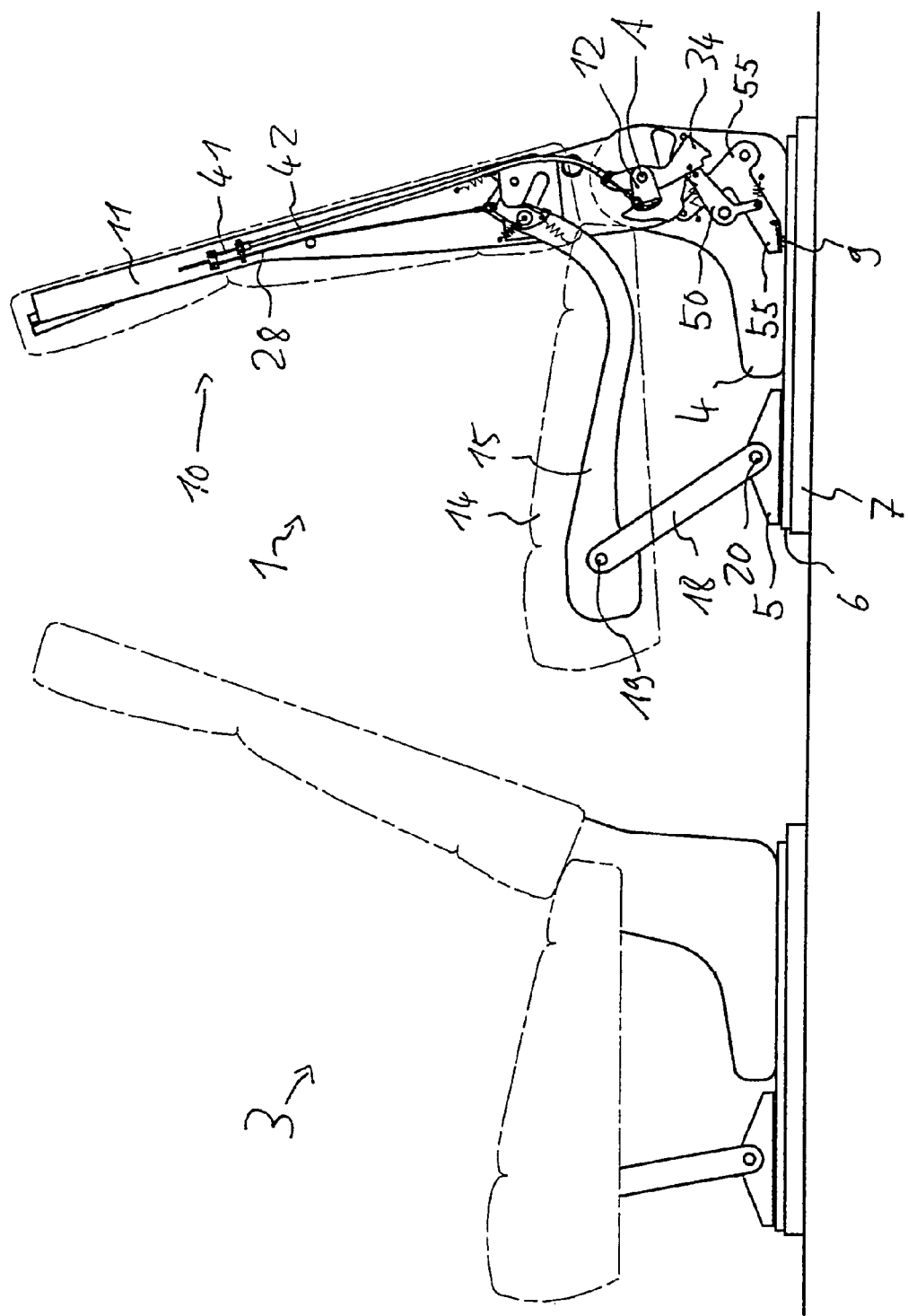
FIG. 2 is a side view of the vehicle seat folded forward in an easy-entry position.
Figure 2A:
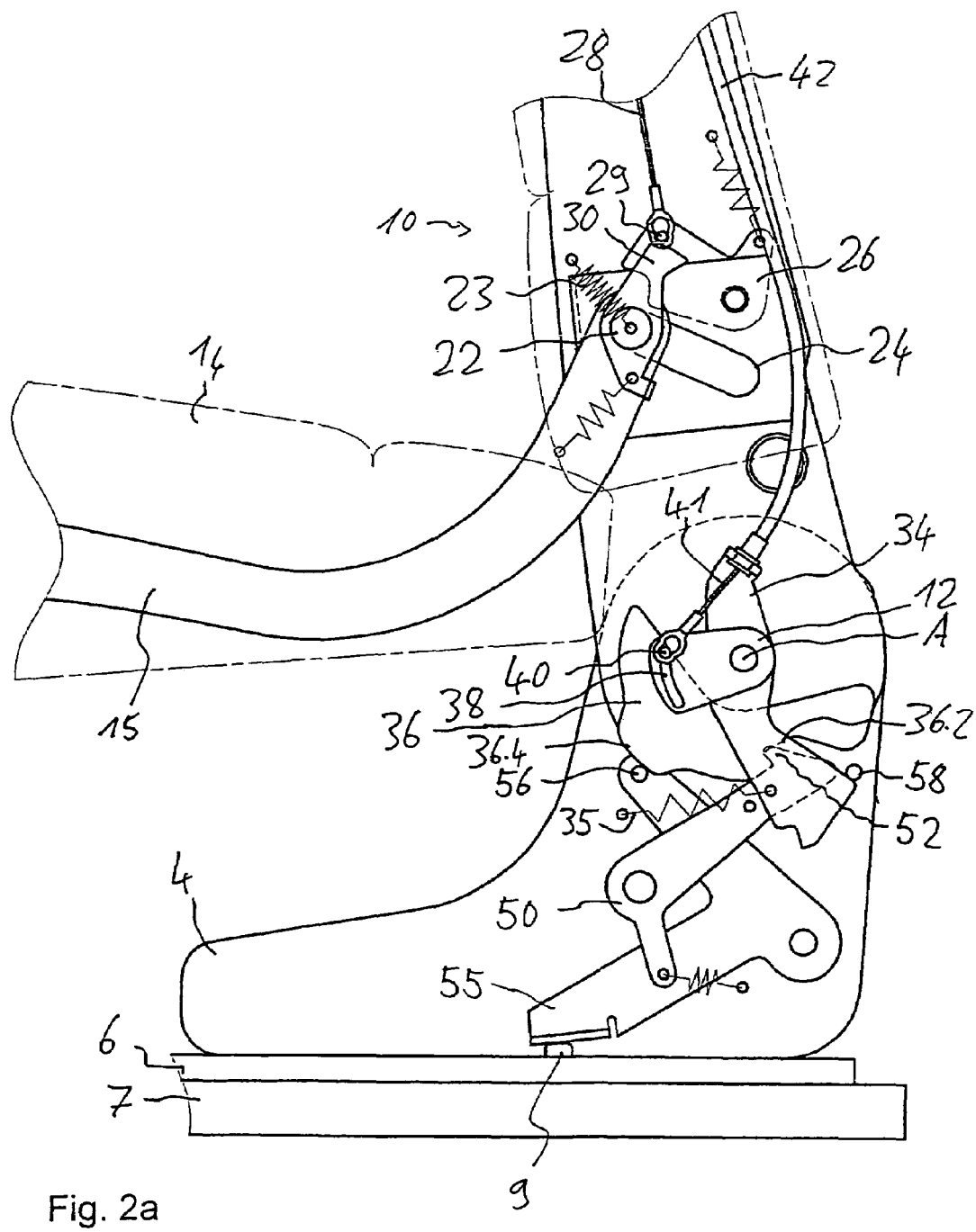
FIG. 2a is a side view of an enlargement of a section of FIG. 2 with the easy-entry lever shown drawn.

As shown in FIG. 2a, the backrest 10 is subsequently folded forward to the easy-entry position. With this folding motion, the pin 29 of the locking cam 26 that is pivotably attached to the backrest frame 11 shifts up to the locking plate 30, which prevents a lowering of the locking cam 26 and thereby the re-latching of the pin 22 or the roller when the user subsequently releases the easy-entry lever 46. In this manner a locking in the intermediate position between the use position and the easy-entry position is excluded.

In the lower portion of the vehicle seat 1, the pin 56 of the rail release lever 55 is moved to or driven against the curve section 36.4 of the control cam 36 that protrudes in a radial direction, so that the rail release lever 55 is pivoted counterclockwise, and the rail release mechanism 9 is actuated, so that the vehicle seat 1 is released in a longitudinal direction. The hook 52 of the retaining plate 50 drops into the recess 36.2 in the control cam 36 that is fixed to the backrest, and thus fixes the backrest 10 in place against counterclockwise folding movements, i.e. against folding forward.

Figure 3:
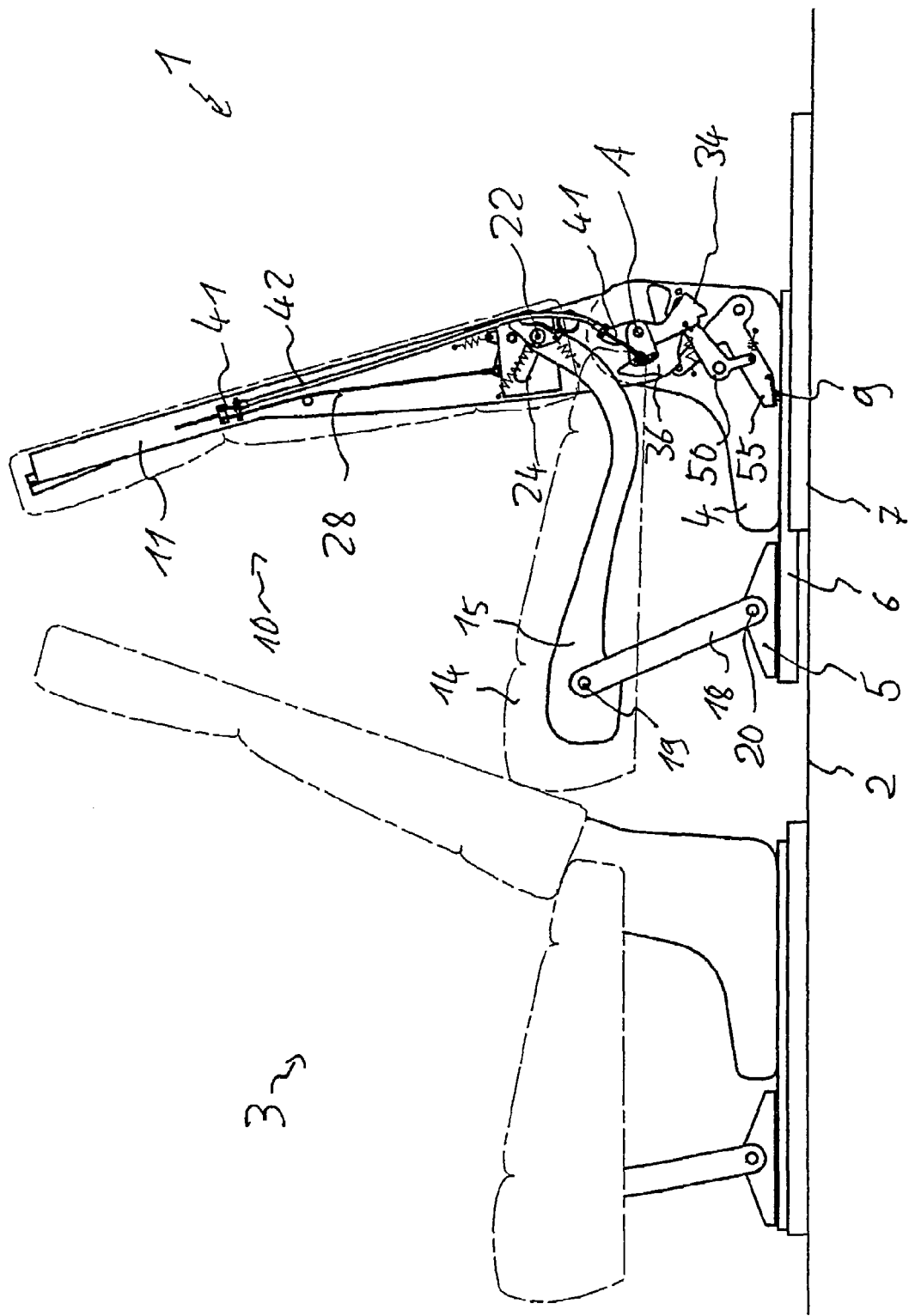
FIG. 3 is a side view of the vehicle seat in the second row of seating in the easy-entry position and its farthest forward longitudinal position, in which the seat cushion is shifted toward the rear.
Figure 3A:
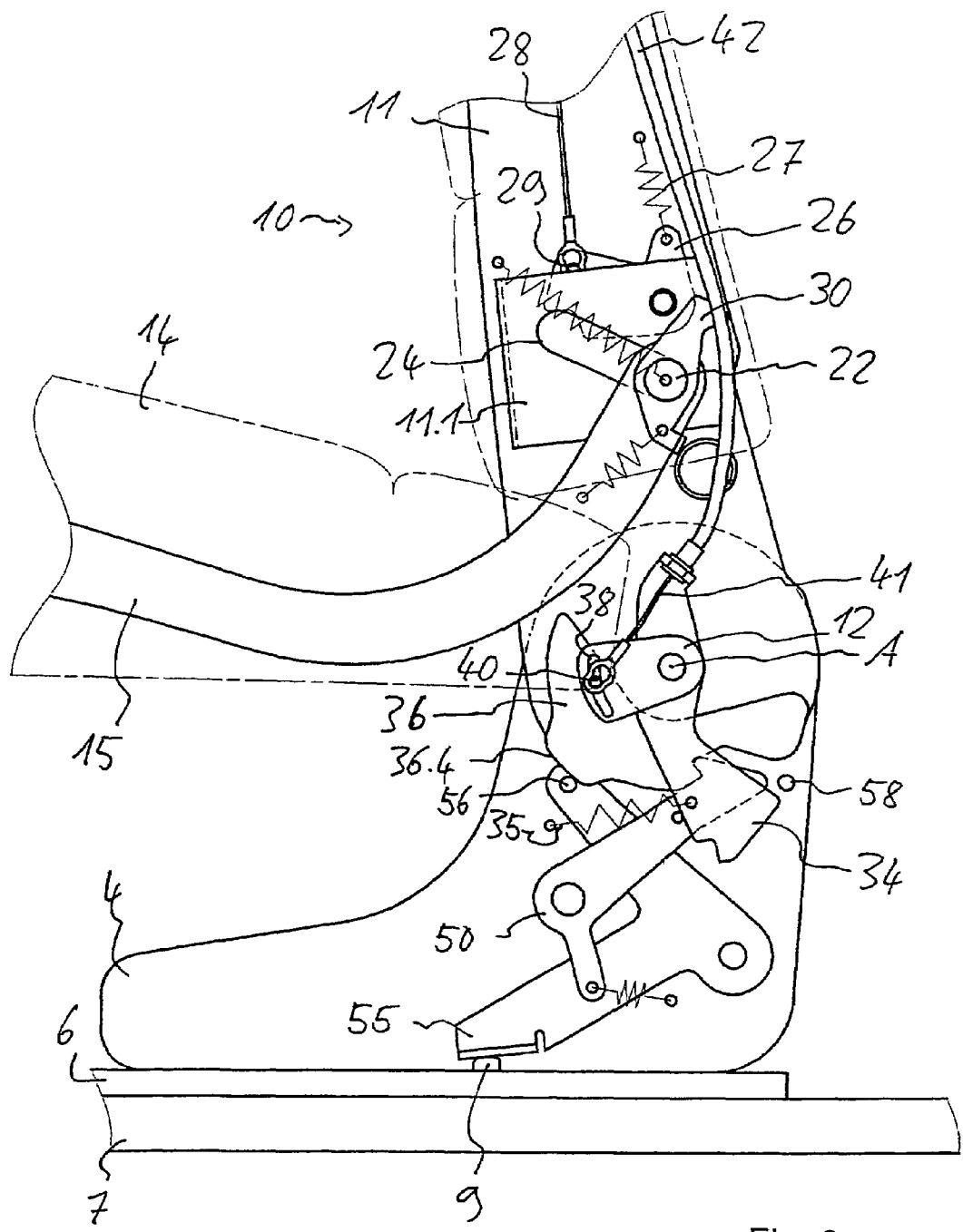
FIG. 3a is a side view of an enlargement of a section of FIG. 3.

The vehicle seat 1 is then shifted forward, as shown in FIG. 3, along with its upper rails 6, in which position it can strike against the vehicle seat 3 in the front row of seating, due to the tight space limitations. In accordance with the invention, the seat cushion 14 with its seat cushion frame 15 is shifted toward the rear. The front region of the seat cushion frame 15 thereby pivots toward the rear with the rocker arm 18 around its pivot point 20, and the pin 22 or the roller 22 at the rear of the seat cushion frame 15 glides or rolls downward and toward the rear in the guide 24. The easy-entry lever 46 is released as shown in FIG. 3a, so that the control cables 28 and 41 slacken, and both the locking cam 26 and the release lever 12 pivot back counterclockwise under the relaxation of their spring actions. The release lever 12 is partially retracted thereby, until the stop adjustment mechanism between the backrest 10 and the bracket 4 reaches an open region without engagement. In this manner, the stop adjustment mechanism can be configured especially with toothing between its parts that are affixed to the backrest and those affixed to the bracket, wherein the parts are configured without toothing in a center region, i.e. with a toothless segment. In this way, when the release lever 12 pivots back, the inner stop adjustment mechanism reaches a toothless region. The stop adjustment mechanism thus remains released.

In this manner, a longitudinal shift of the vehicle seat to the easy-entry position is possible, even under tight space limitations, in that the seat cushion 14 yields correspondingly in a longitudinal direction, without the functionality of the easy-entry position being thereby impaired. In this, the shifting occurs against the preload of the spring 23.

FIGS. 5a through 5d show a further embodiment of a vehicle seat according to the invention. In place of the pin/slot/guide 22, 24 of the first embodiment, a lever mechanism 60, 62, 63 is selected here for the longitudinally displaceable connection of the seat cushion frame 15 to the backrest frame 11. In this manner, the seat cushion frame 15 is pivotably attached via its pin 60 to a lever 62 at its back, which in turn is attached at a joint 63 to the backrest frame 11 or its bearing plate 11.1.

The second embodiment is further changed in the drawings as compared to the first embodiment in that the bearing plate 11.1 in the second embodiment covers the locking plate 30 and the locking cam 26, and in that its shape is changed somewhat. The lever 62 lies in front of the bearing plate 11.1, which in turn lies in front of the locking plate 30 and the locking cam 26, wherein the locating pin 29 of the locking cam 26 that is taken up by the first control cable 28 is spaced somewhat from the locking plate 30. Furthermore, a guide 64 for the locating pin 29 is provided in the bearing plate 11.1. The locking plate 30 and the locking cam 26 are otherwise unchanged relative to the first embodiment.

Figure 5A:
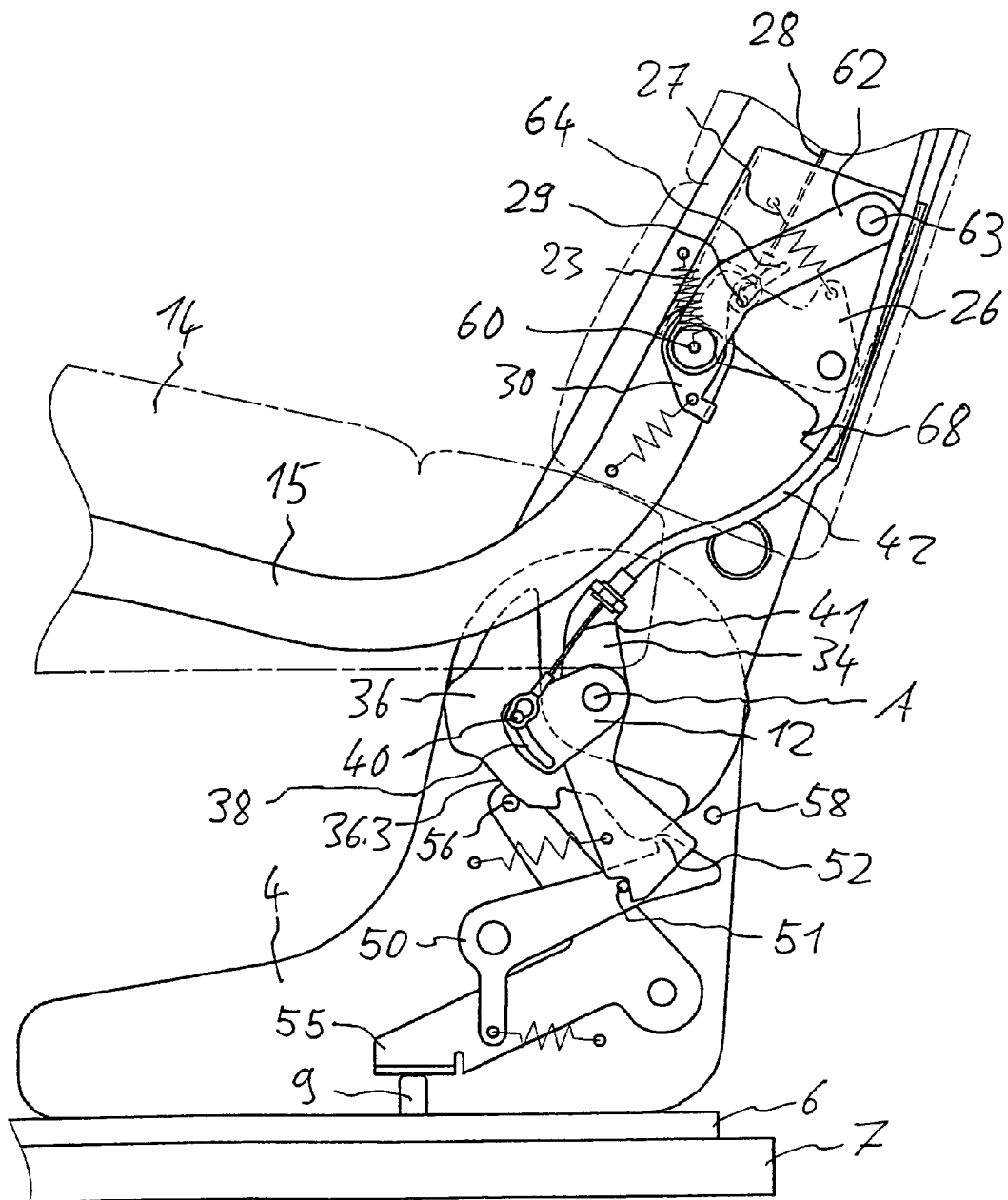
Figure 5B:
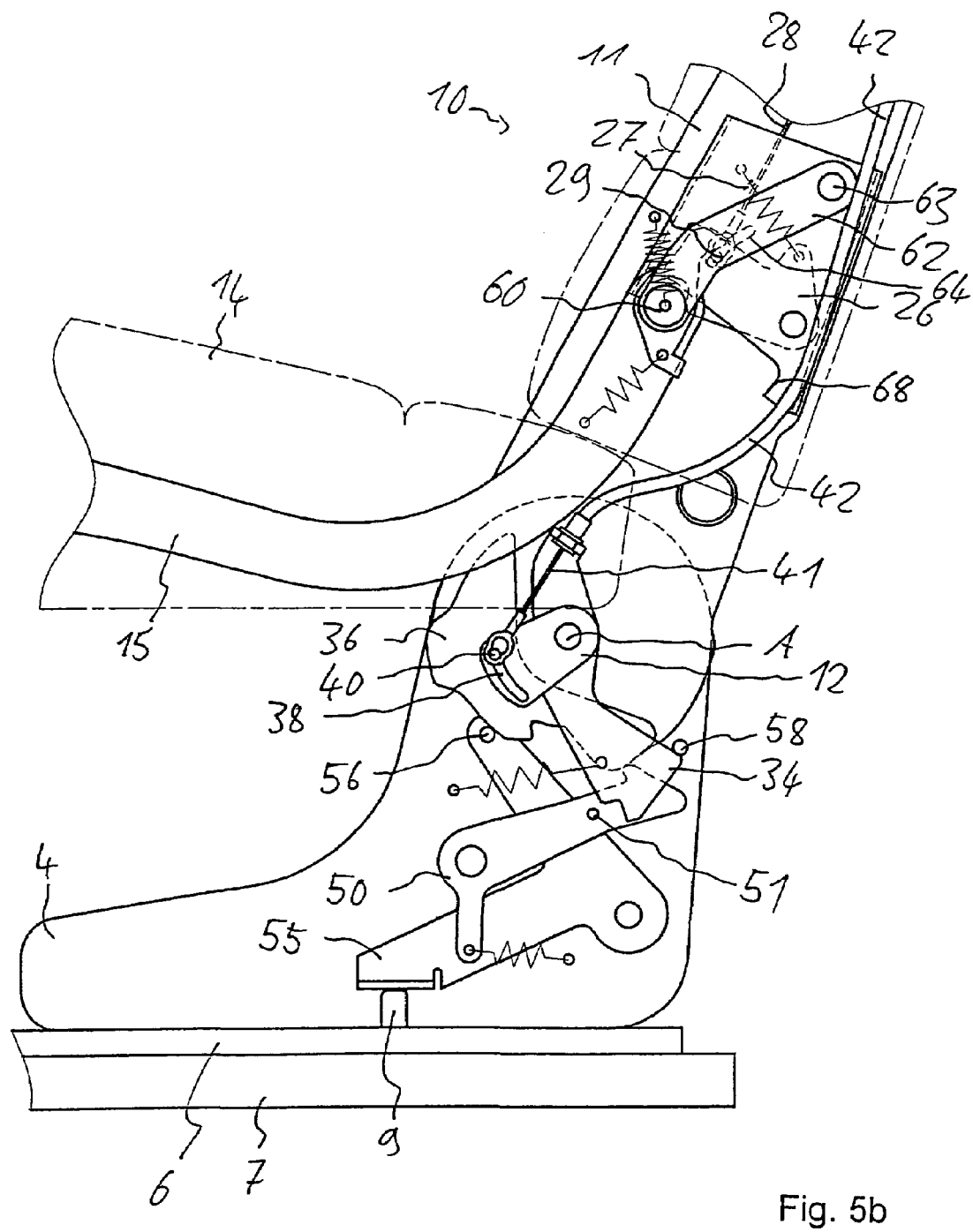
FIG. 5b is a side view of the vehicle seat of FIG. 5a with a slightly raised easy-entry lever, i.e. according to FIG. 1b.
Figure 5C:
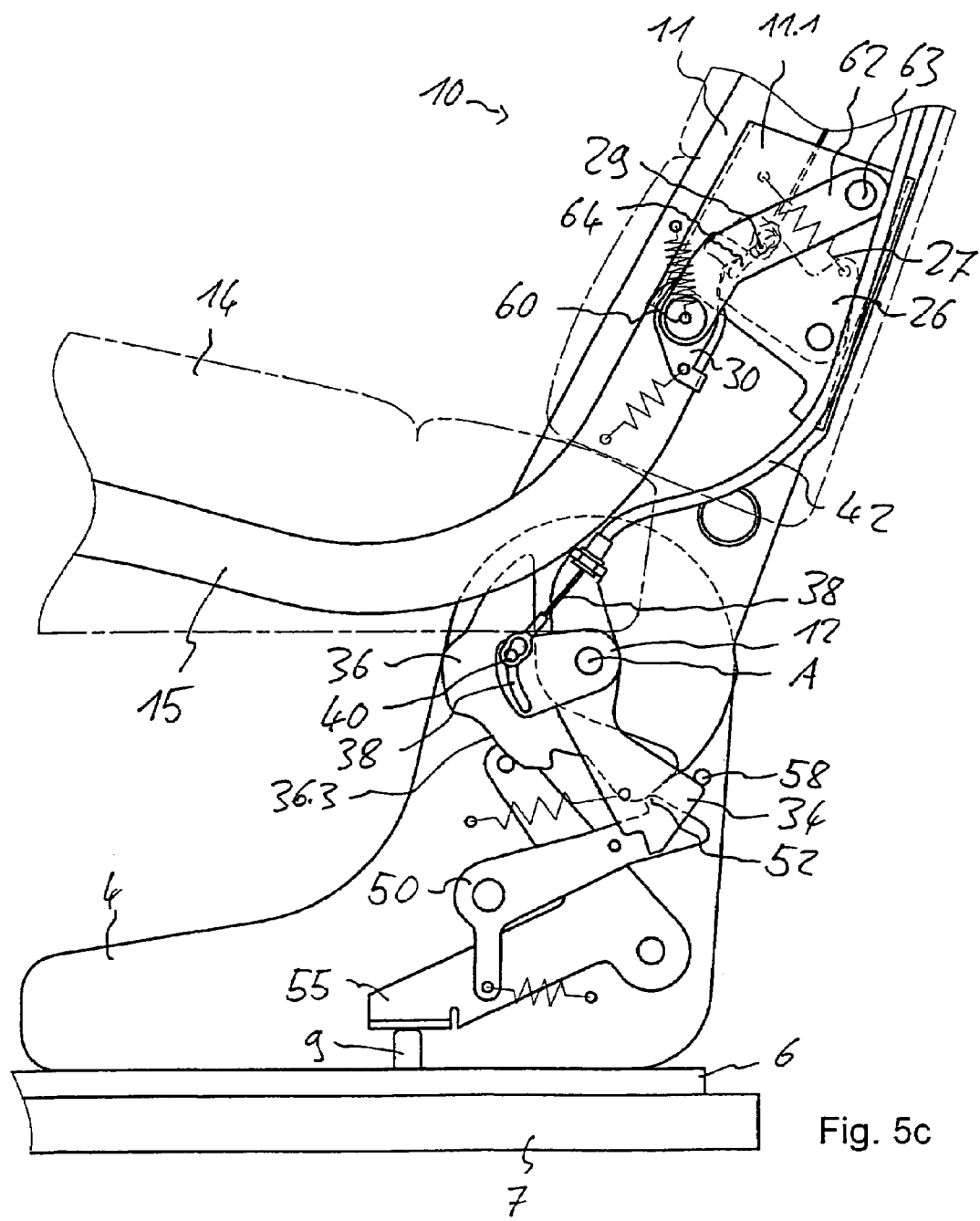
FIG. 5c is a side view of the vehicle seat of FIG. 5b with the easy-entry lever projecting forward and a released stop adjustment mechanism, with the backrest unmoved, i.e. according to FIG. 1c.
Figure 5D:
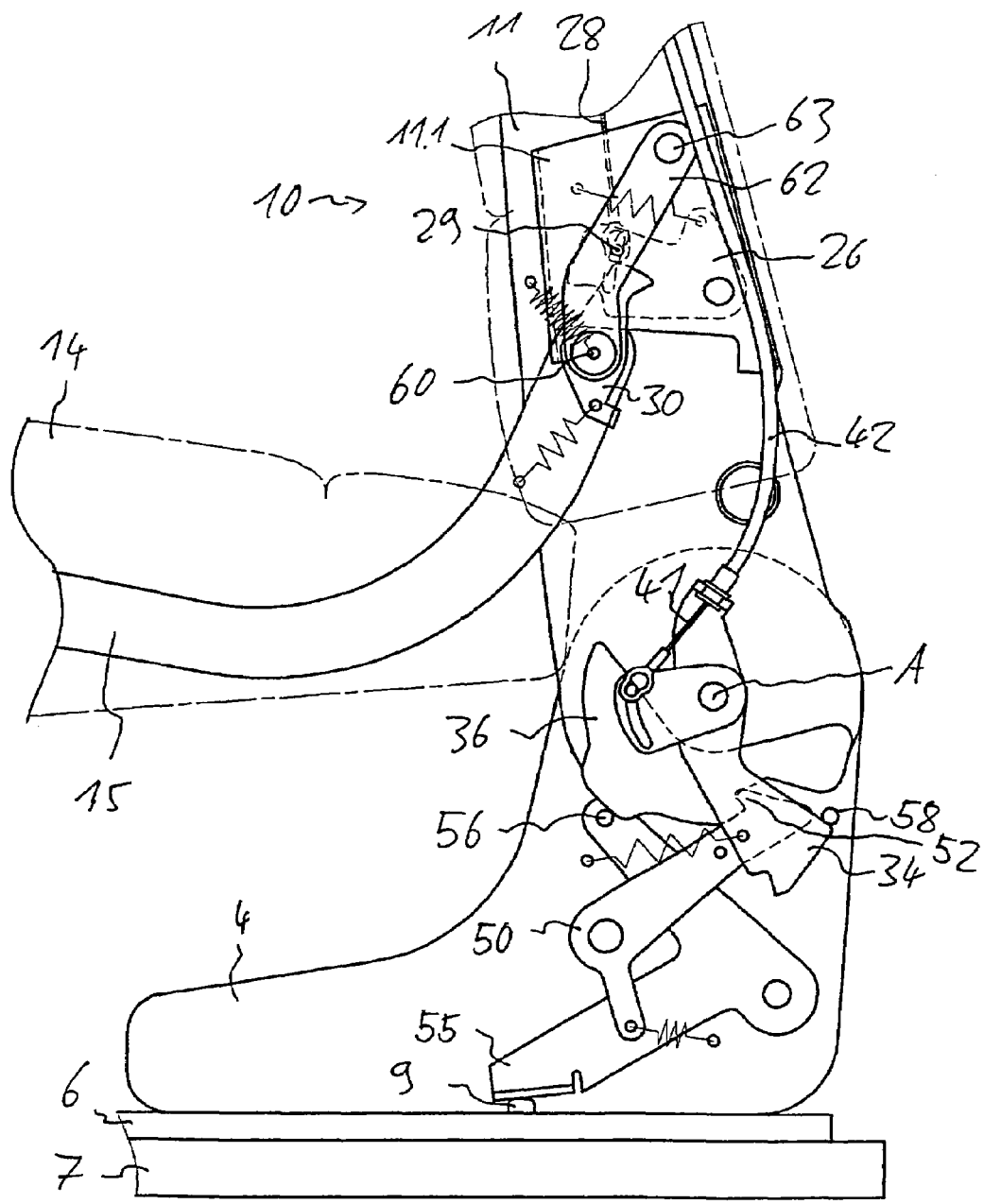

FIGS. 5a through 5d in turn illustrate the adjustment from the use position to the easy-entry position. Starting from the use position shown in FIG. 5a, the easy-entry lever 46 is in turn raised slightly as shown in FIG. 5b, so that the control cables 28 and 41 are drawn somewhat. The shifting in the lower region via the second control cable 41 remains unchanged relative to the first embodiment. As before, the locating pin 29 is first drawn past the locking plate 30 by the first control cable 28, spaced somewhat or with air between them. In FIG. 5c the easy-entry lever 46 is again in its upper final position, and the stop adjustment mechanism between the backrest frame 11 and the bracket 4 is released. The locating pin 29 of the locking cam 26 has passed the end surface of the locking plate 30. The backrest 10 is then folded forward to the position shown in FIG. 5d. The easy-entry lever 26 is drawn further, wherein the locating pin 29 in the guide 64 of the locking cam 26, which has been drawn via the first control cable 28, has moved upward.

Figure 5E:
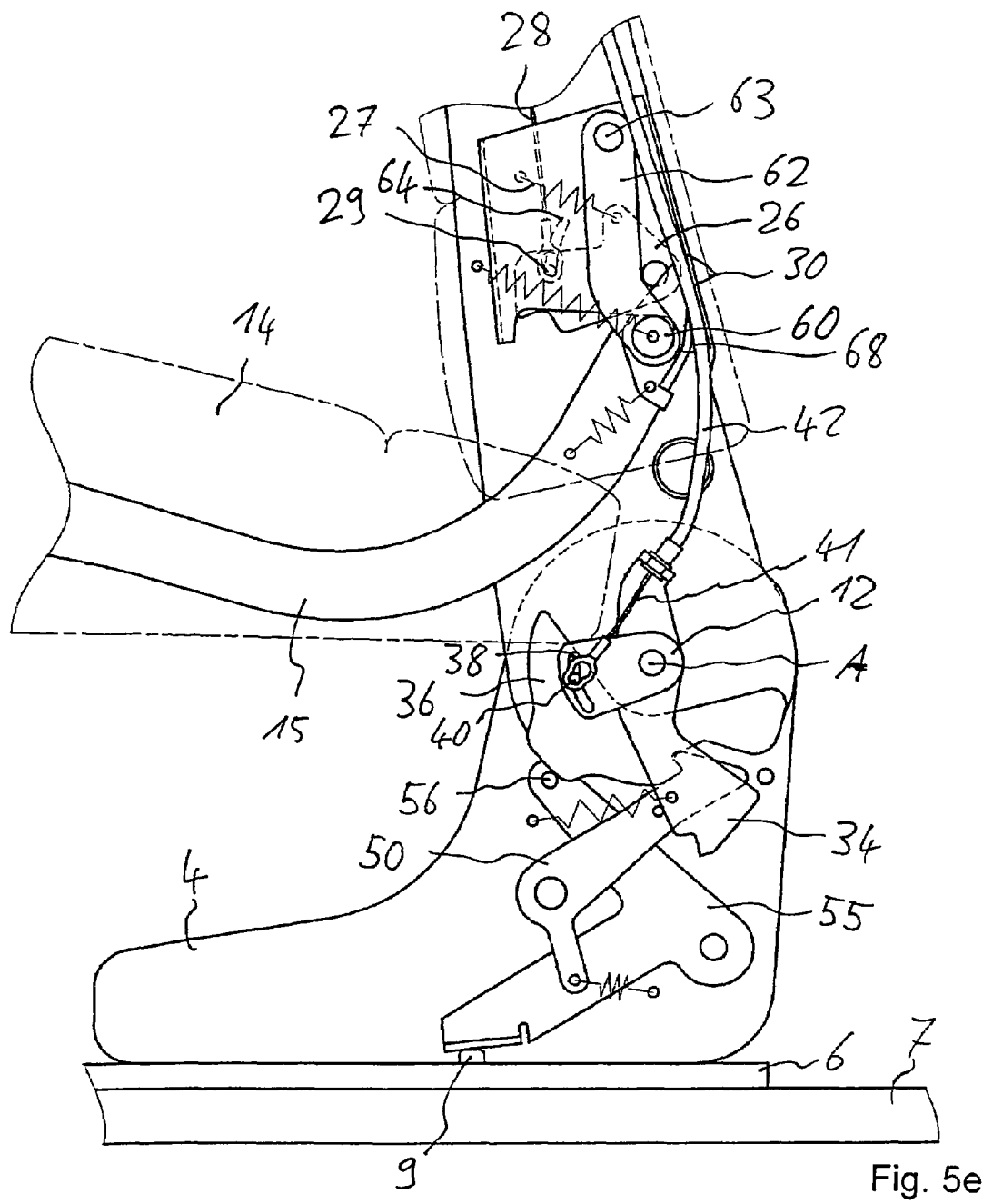

The vehicle seat 1 is then again (as shown in FIGS. 3 and 3a) shifted forward longitudinally to the position shown in FIG. 5e, so that the seat cushion 14 along with the seat cushion frame 15 is shifted toward the rear. The pin 60 that moves toward the rear—and serves as a pivot joint between the seat cushion frame 15 and the lever 62—pivots the lever 62 toward the rear around its joint 63, until it reaches the mechanical stop 68 of the reinforcement plate 11.1 that is fixed to the backrest. The easy-entry lever 46 is again released, the release lever 12 is again retracted somewhat, until the stop adjustment mechanism comes to rest between the backrest frame 11 and the bracket 4 in a toothless segment, and remains released. The locking cam 26 pivots back under the relaxation of its spring 27, wherein the locating pin 29 again reaches the lower mechanical stop of the guide 64.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Vehicle seat, comprising:
  a) a seat frame, the seat frame being longitudinally adjustable on at least one upper rail relative to at least one lower rail affixed to a chassis;
  b) the seat frame being lockable in longitudinal positions by a longitudinal locking mechanism, which can be released by a rail release mechanism;
  c) a backrest, the backrest including a backrest frame pivotably attached to the seat frame about a backrest pivoting axis, and which is lockable by a click-stop adjustment mechanism on the seat frame, and which, once released, in use, can be folded forward from an upright use position to an easy-entry position;
  d) a release lever for releasing the click-stop adjustment mechanism;
  e) an easy-entry device for actuating the release lever;
  f) a seat cushion, the seat cushion being shiftable relative to the seat frame with a seat cushion frame;
  g) a longitudinally adjustable connection being provided between the seat cushion frame and the backrest frame;
  h) the longitudinally adjustable connection including a guide provided on the backrest frame, and a guide element provided on the seat frame;
  i) the guide element including one of:
    1) a pin fastened to the seat cushion frame and guided in the guide; and
    2) a roller fastened to the seat cushion frame and guided in the guide;
  j) the seat cushion frame is shifted forward longitudinally in a coupled adjustment motion, in use, when the backrest frame is folded forward to the easy-entry position; and
  k) when the vehicle seat is in the easy-entry position, in use, the seat cushion frame is shiftable toward the rear relative to the backrest frame and the seat frame.

2. Vehicle seat according to claim 1, wherein:
  a) a spring device is provided; and
  b) when the vehicle seat is in the easy-entry position, in use, the seat cushion frame is biased toward the front by the spring device.

3. Vehicle seat according claim 1, wherein:
  a) a travel distance between the seat cushion frame and the backrest frame is limited by a mechanical limiting element.

4. Vehicle seat according to claim 1, wherein:
  a) the longitudinally adjustable connection includes a lever mechanism, which is pivotably attached to the seat cushion frame and to the backrest frame.

5. Vehicle seat according to claim 1, wherein:
  a) a locking cam is pivotably attached to the backrest frame, and can be pivoted against a spring preload by way of a first control cable actuatable by the easy-entry device;
  b) the locking cam, in an original position, locks a pin provided on the seat cushion frame, in use, in a longitudinal direction toward the rear, and releases it in its actuated position with the actuated easy-entry device; and c) when the backrest is folded forward in the easy-entry position, in use, and the seat cushion frame is not shifted toward the rear, a locking element holds the locking cam in its released position.

6. Vehicle seat according to claim 5, wherein:
  a) when the seat cushion frame has been shifted toward the rear, in use, the locking element releases the locking cam.

7. Vehicle seat according to claim 5, wherein:
  a) the locking element is pivotably attached to the pin provided on the seat cushion frame.

8. Vehicle seat, comprising:
  a) a seat frame, the seat frame being longitudinally adjustable on at least one upper rail relative to at least one lower rail affixed to a chassis;
  b) the seat frame being lockable in longitudinal positions by a longitudinal locking mechanism, which can be released by a rail release mechanism;
  c) a backrest, the backrest including a backrest frame pivotably attached to the seat frame about a backrest pivoting axis, and which is lockable by a click-stop adjustment mechanism on the seat frame, and which, once released, in use, can be folded forward from an upright use position to an easy-entry position;
  d) a release lever for releasing the click-stop adjustment mechanism;
  e) an easy-entry device for actuating the release lever;
  f) a seat cushion, the seat cushion being shiftable relative to the seat frame with a seat cushion frame;
  g) a longitudinally adjustable connection being provided between the seat cushion frame and the backrest frame;
  h) the longitudinally adjustable connection including a guide provided on the backrest frame, and a guide element provided on the seat frame;
  i) the guide being on a side of the backrest frame, extending substantially in a straight line, and sloping downward from the front to the rear;
  j) the seat cushion frame is shifted forward longitudinally in a coupled adjustment motion, in use, when the backrest frame is folded forward to the easy-entry position; and
  k) when the vehicle seat is in the easy-entry position, in use, the seat cushion franc is shiftable toward the rear relative to the backrest frame and the seat frame.

9. Vehicle seat according to claim 8, wherein:
  a) a spring device is provided; and
  b) when the vehicle seat is in the easy-entry position, in use, the seat cushion frame is biased toward the front by the spring device.

10. Vehicle seat according claim 8, wherein:
  a) a travel distance between the seat cushion frame and the backrest frame is limited by a mechanical limiting element.

11. Vehicle seat according to claim 8, wherein:
  a) the longitudinally adjustable connection includes a lever mechanism, which is pivotably attached to the seat cushion frame and to the backrest frame.

12. Vehicle seat according to claim 8, wherein:
  a) a locking cam is pivotably attached to the backrest frame, and can be pivoted against a spring preload by way of a first control cable actuatable by the easy-entry device;
  b) the locking cam, in an original position, locks a pin provided on the seat cushion frame, in use, in a longitudinal direction toward the rear, and releases it in its actuated position with the actuated easy-entry device; and c) when the backrest is folded forward in the easy-entry position, in use, and the seat cushion frame is not shifted toward the rear, a locking element holds the locking cam in its released position.

13. Vehicle seat according to claim 12, wherein:
a) when the seat cushion frame has been shifted toward the rear, in use, the locking element releases the locking cam.

14. Vehicle seat, comprising:
a) a seat frame, the seat frame being longitudinally adjustable on at least one upper rail relative to at least one lower rail affixed to a chassis;
b) the seat frame being lockable in longitudinal positions by a longitudinal locking mechanism, which can be released by a rail release mechanism;
c) a backrest, the backrest including a backrest frame pivotably attached to the seat frame about a backrest pivoting axis, and which is lockable by a click-stop adjustment mechanism on the seat frame, and which, once released, in use, can be folded forward from an upright use position to an easy-entry position;
d) a release lever for releasing the click-stop adjustment mechanism;
e) an easy-entry device for, actuating the release lever;
f) a seat cushion, the seat cushion being shiftable relative to the seat frame with a seat cushion frame;
g) a longitudinally adjustable connection being provided between the seat cushion frame and the backrest frame;
h) the longitudinally adjustable connection including a lever mechanism, which is pivotably attached to the seat cushion frame and to the backrest frame;
i) the seat cushion frame is shifted forward longitudinally in a coupled adjustment motion, in use, when the backrest frame is folded forward to the easy-entry position; and
j) when the vehicle seat is in the easy-entry position, in use, the seat cushion frame is shiftable toward the rear relative to the backrest frame and the seat frame.

15. Vehicle seat according to claim 14, wherein:
a) a spring device is provided; and
b) when the vehicle seat is in the easy-entry position, in use, the seat cushion frame is biased toward the front by the spring device.

16. Vehicle seat, comprising:
a) a seat frame, the seat frame being longitudinally adjustable on at least one upper rail relative to at least one lower rail affixed to a chassis;
b) the seat frame being lockable in longitudinal positions by a longitudinal locking mechanism, which can be released by a rail release mechanism;
c) a backrest, the backrest including a backrest frame pivotably attached to the seat frame about a backrest pivoting axis, and which is lockable by a click-stop adjustment mechanism on the seat frame, and which, once released, in use, can be folded forward from an upright use position to an easy-entry position;
d) a release lever for releasing the click-stop adjustment mechanism;
e) an easy-entry device for actuating the release lever;
f) a seat cushion, the seat cushion being shiftable relative to the seat frame with a seat cushion frame;
g) a control cam provided on a lower portion of the backrest frame, and by which a rail release lever is guided for the purpose of actuating the rail release mechanism; and
h) the rail release lever is not actuated, in use, when the backrest is upright;
i) when the backrest is folded forward in the easy-entry position. in use, the rail release lever is actuated for rail release;
j) the seat cushion frame is shifted forward longitudinally in a coupled adjustment motion, in use, when the backrest frame is folded forward to the easy-entry position; and
k) when the vehicle seat is in the easy-entry position, in use, the seat cushion frame is shiftable toward the rear relative to the backrest frame and the seat frame.

17. Vehicle seat according to claim 16, wherein:
a) a retaining element is pivotably attached to the seat frame, and abuts the control cam on the side of the backrest, spring preloaded, so that when the backrest is in the upright use position, the retaining element is in an unlocked position, in use; and
b) when the backrest is folded forward in the easy-entry position, in use, it is locked in the control cam to limit the forward-folding movement of the backrest.

18. Vehicle seat according to claim 16, wherein:
a) the rail release lever is actuated by the easy-entry lever by a second control cable, in use, which is guided with a locating pin in a guide of the release lever.

19. Vehicle seat according to claim 18, wherein:
a) a control cable sheath of the second control cable is attached to a pivoting element that is pivotably attached about the backrest pivoting axis such that when the second control cable is actuated, in use, the pivoting element reaches a mechanical stop on the seat frame, and then the release lever for the click-stop adjustment mechanism is actuated and releases the click-stop adjustment mechanism.

20. Vehicle seat according to claim 16, wherein:
a) a spring device is provided; and
b) when the vehicle seat is in the easy-entry position, in use, the seat cushion frame is biased toward the front by the spring device.

* * * * *